(12) United States Patent
Robrish et al.

(10) Patent No.: US 6,532,110 B1
(45) Date of Patent: Mar. 11, 2003

(54) POLARIZATION DEVICE

(75) Inventors: Peter Robrish, San Francisco, CA (US); Andreas Weber, Redwood City, CA (US); Ian Hardcastle, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/517,909

(22) Filed: Mar. 3, 2000

(51) Int. Cl.⁷ .............................. G02B 5/30; G02B 27/28
(52) U.S. Cl. ...................... 359/485; 359/487; 359/495; 359/497; 359/900
(58) Field of Search ................... 359/485, 487, 359/494, 495, 497, 900

(56) References Cited

U.S. PATENT DOCUMENTS

| | | | | |
|---|---|---|---|---|
| 2,748,659 A | * | 6/1956 | Geffcken et al. | 359/487 |
| 3,876,285 A | * | 4/1975 | Schwarzuller | |
| 5,566,367 A | * | 10/1996 | Mitsutake et al. | 359/497 |
| 5,650,873 A | * | 7/1997 | Gal et al. | 359/494 |
| 5,751,480 A | * | 5/1998 | Kitagishi | 359/485 |
| 5,757,547 A | * | 5/1998 | Rodman et al. | 359/497 |
| 5,898,521 A | * | 4/1999 | Okada | 359/487 |
| 5,978,136 A | * | 11/1999 | Ogawa et al. | 359/487 |
| 6,028,703 A | * | 2/2000 | Sekine et al. | 359/487 |
| 6,038,054 A | * | 3/2000 | Sakai et al. | 359/485 |
| 6,081,378 A | * | 6/2000 | Romano et al. | 359/497 |
| 6,111,700 A | * | 8/2000 | Kobayashi et al. | 359/502 |

FOREIGN PATENT DOCUMENTS

| | | | |
|---|---|---|---|
| EP | 0957387 A1 | 11/1999 | G02B/27/28 |
| WO | WO 99/61942 | 12/1999 | G02B/5/30 |

* cited by examiner

*Primary Examiner*—Ricky D. Shafer

(57) ABSTRACT

A polarization device comprising: a light path; a micro lens array disposed in the light path for separating light into a plurality of individual beams of light; a polarization filter disposed in the light path to receive a plurality of the beams of light and to transmit the received light of a desired polarization state and reflect the received light of a perpendicular polarization state that is perpendicular to the desired polarization state; and a reflecting polarization converter disposed to receive and reflect the reflected light of the perpendicular polarization state and to convert the perpendicular polarization state to the desired polarization state.

17 Claims, 2 Drawing Sheets

POLARIZATION DEVICE

BACKGROUND OF THE INVENTION

1. Field of the Invention

The present invention relates generally to optical systems, and more particularly, to a high efficiency polarization device for converting substantially all incoming light into a single polarization.

2. Description of the Related Art

Applications that use liquid crystal cells to render an image usually require linearly polarized input light to function properly. Conventional light sources are typically unpolarized. In order to polarize this light, it is passed through a polarizer, which transmits the desired polarization state and absorbs or deflects the unusable, perpendicular polarization state. Thus, approximately half of the incoming source light has to be discarded, resulting in reduced system efficiency and brightness.

Solutions to the foregoing efficiency problem have been developed to transform the light from the unusable polarization state into the desired state. One solution developed by 3M Company is a dual brightness enhancement film which is used in laptop LCD displays to increase screen brightness. The film transmits the desired polarization state and reflects the perpendicular polarization state back to the light source. Due to scatter and reflection, part of this light is reflected back in the desired polarization state and passes to the screen. However, due to high brightness requirements and light absorption in the source, this approach is of limited efficiency for use in LCD projection applications.

Another solution in the art is the use of a polarizing beam splitter of the type shown in FIG. 1. Unpolarized light 10 is directed to a polarizing beam splitter 12. A desired light polarization is transmitted by the polarizing beam splitter 12 and is represented by the light beam 14. The polarizing beam splitter 12 reflects the perpendicular state of polarization. This reflected perpendicular state of polarization is then directed by a mirror 16 through a half wave plate 18, which functions to change the polarization state of the reflected light into light 20 with the desired state of polarization. In theory, the total amount of unpolarized incoming light is transformed into linearly polarized light. However, the resulting light consists of two distinct optical beams, which are difficult to utilize in an optical system. Large and more expensive optics would be required in order to facilitate the utilization of both beams, and the optical efficiency of such a complex system would typically not be optimum. Accordingly, there continues to be an efficiency problem in the conversion of light to a single polarization.

SUMMARY OF THE INVENTION

The invention provides a polarization device that comprises a light path, a micro lens array, a polarization filter and a reflecting polarization converter. The micro lens array is disposed in the light path for separating light into a plurality of individual beams of light. The polarization filter comprises a polarizing film and is disposed in the light path to receive a plurality of the beams of light. The polarization filter transmits the received light of a desired polarization state and reflects the received light of the perpendicular polarization state that is perpendicular to the desired polarization state.

The reflecting polarization converter is disposed to receive and reflect the reflected light of the perpendicular polarization state. The reflecting polarization converter converts the perpendicular polarization state to the desired polarization state. The polarization filter and the reflecting polarization converter are separated by a non-solid filled gap. The reflecting polarization converter re-reflects at least a portion of the converted light back onto the polarization filter.

The invention also provides a polarizing device that comprises a light path, a micro lens array, a polarization filter and a reflecting polarization converter. The micro lens array is disposed in the light path for separating light into a plurality of individual beams of light. The micro lens array comprises a plurality of micro lenses, wherein each of the micro lenses in the micro lens array has a centerline. The polarization filter comprises a polarizing film and is disposed in the light path to receive a plurality of the beams of light and to transmit the received light of a desired polarization state and to reflect the received light of a perpendicular polarization state that is perpendicular to the desired polarization state. The polarization filter is shaped to comprise a plurality of surface features, wherein each of the surface features is shaped symmetrically about a center line to reflect light from a different one of the individual beams of light in at least two directions at an acute angle to the different one of the individual beams of light.

The reflecting polarization converter is disposed between the micro lens array and the polarization filter, separated from the polarization filter by a non-solid filled gap. The reflecting polarization converter receives and reflects the reflected light of the perpendicular polarization state and converts the perpendicular polarization state to the desired polarization state. The reflecting polarization converter includes a plurality of transmissive regions, wherein each of the transmissive regions has a centerline aligned with a different one of the individual beams of light to transmit the beam of light aligned with it. The plurality of micro lenses each has its centerline aligned with the centerline for one of the transmissive regions and with the centerline for one of the features of the polarization filter. The reflecting polarization converter re-reflects at least a portion of the converted light back onto the polarization filter.

The invention also provides a method for polarizing light. In the method, light in a light path is separated into a plurality of individual beams of light, wherein each of the plurality of individual beams of light is passed through a different associated transmissive region in an element. The plurality of individual beams of light is also passed through a non-solid filled gap to a polarization filter comprising a polarizing film. The plurality of individual beams is filtered with the polarization filter into light beams with a desired polarization state and light beams with a perpendicular polarization state substantially perpendicular to the desired polarization state. The light beams of the desired polarization state are transmitted with a first range of emission angles. The light beams with the perpendicular polarization state are reflected, not straight back into the transmissive region associated with the light beam, but back through the gap toward the element onto a surface on the element adjacent the associated transmissive region in the element. The perpendicular polarization state is converted to the desired polarization state. The reflected light beams of the perpendicular polarization state are re-reflected from the surface back through the gap toward the polarization filter. The re-reflected light beams have substantially the same range of emission angles as the first range of emission angles of the transmitted light beams of the desired polarization state.

The invention also provides a polarization device that comprises a light path, a micro lens array, a polarization filter and a reflecting polarization converter. The micro lens array is disposed in the light path for separating light into a plurality of individual beams of light. The micro-lens array comprises a plurality of micro-lenses, each of which has a centerline. The polarization filter comprises a polarizing film and is disposed in the light path to receive a plurality of the beams of light and to transmit the received light of a desired polarization state and to reflect the received light of a perpendicular polarization state that is perpendicular to the desired polarization state. The polarization filter additionally comprises a plurality of pyramid shaped surface features, wherein each of the pyramid shaped surface features is formed symmetrically about a different respective centerline.

The reflecting polarization converter is disposed to receive and reflect the reflected light of the perpendicular polarization state and to convert the perpendicular polarization state to the desired polarization state. The polarization converter comprises a mirror backing, a quarter wave plate coupled to the mirror backing, and a plurality of transmissive regions. The transmissive regions have a centerline. The polarization filter and the reflecting polarization converter are separated by a non-solid filled gap.

The plurality of the micro lenses each has its centerline aligned with the centerline of one of the transmissive regions in the reflecting polarization converter and with the centerline for one of the pyramid shape surface features of the polarization filter. The reflecting polarization converter re-reflects at least a portion of the converted light back onto the polarization filter.

Finally, the invention provides a polarization device that comprises a light path, a micro lens array, a polarization filter and a reflecting polarization converter. The micro lens array is disposed in the light path for separating light into a plurality of individual beams of light. The micro lens array comprises a plurality of lenses each with a centerline. The polarization filter comprises a polarizing film and is disposed in the light path to receive a plurality of the beams of light and to transmit the received light of a desired polarization state and to reflect the received light of a perpendicular polarization state that is perpendicular to the desired polarization state. The polarization filter additionally comprises a plurality of surface features each shaped symmetrically about a centerline. The reflecting polarization converter is disposed to receive and reflect the reflected light of the perpendicular polarization state and to convert the perpendicular polarization state to the desired polarization state. The reflecting polarization converter is separated from the polarization filter by a non-solid filled gap. The reflecting polarization converter re-reflects at least a portion of the converted light back onto the polarization filter.

DETAILED DESCRIPTION OF THE PREFERRED EMBODIMENT

Figure 1:
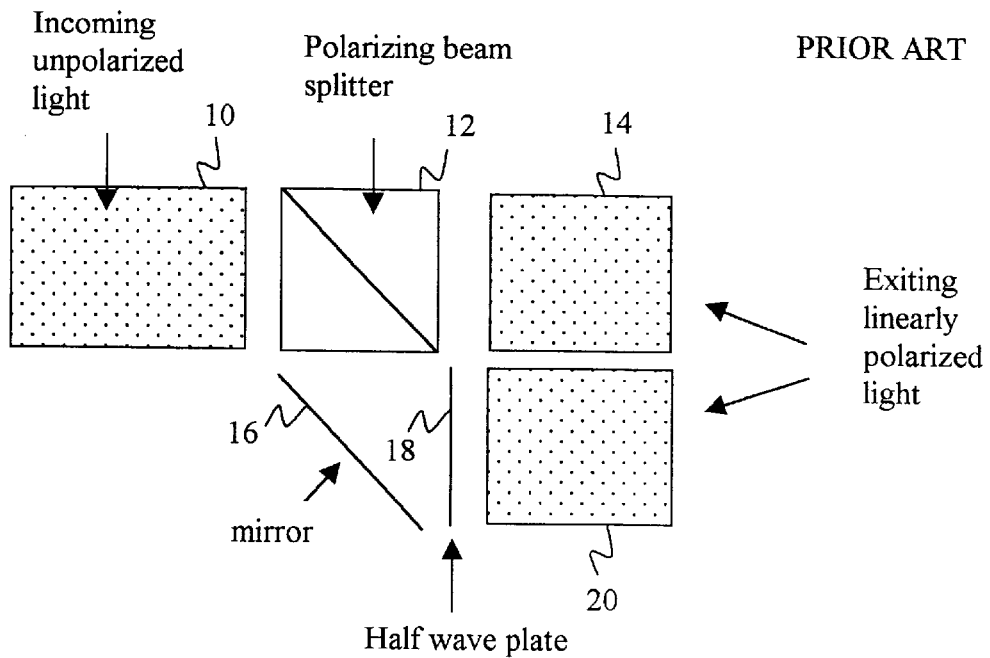
FIG. 1 is a schematic block diagram of an embodiment of the prior art.
Figure 2:
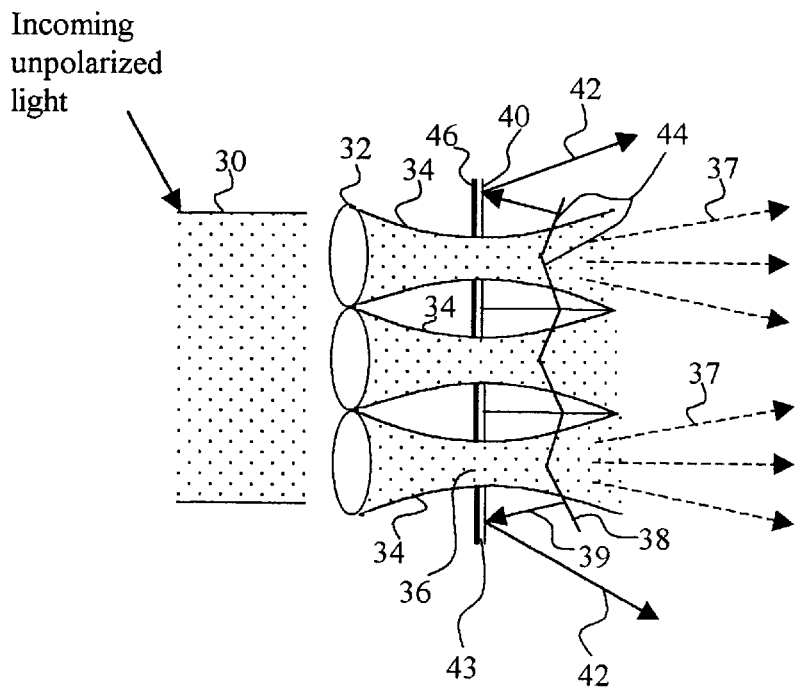
FIG. 2 is a schematic block diagram of a first embodiment of the present invention.

Referring now to FIG. 2, there is shown a first embodiment of the present invention. Incoming unpolarized light 30 is directed to a micro lens array 32 that operates to separate the incoming unpolarized light 30 into a multitude of individual beams 34. A variety of different types of micro lens array 32 are available for implementing the present invention, and example parameters for such arrays will be discussed below. As described by fundamental optics, the divergence of each of the individual beams created by the individual lenses in the micro lens array 32 will be larger than the divergence of the original beam 30.

A polarization filter 38 is disposed in the light path of the light beams 34. The polarization filter 38 transmits with a given range of emission angles received light 37 of a desired polarization state, while substantially reflecting that received light 39 that has a polarization state that is perpendicular to the desired polarization state. By way of example, this polarization filter 38 may be comprised of a formable film for separating the perpendicular polarizations. Dual brightness enhancement film made by 3M Company, or alternatively any device which performs polarization separation filtering may be utilized to implement the polarization filter 38.

In a preferred embodiment, the polarization filter 38 is formed to include a plurality of features 44 shaped so as not to reflect the perpendicular polarization of an individual beam straight back in the direction from which it has come, but rather to a designated region on a reflecting polarization converter 40.

Figure 3:
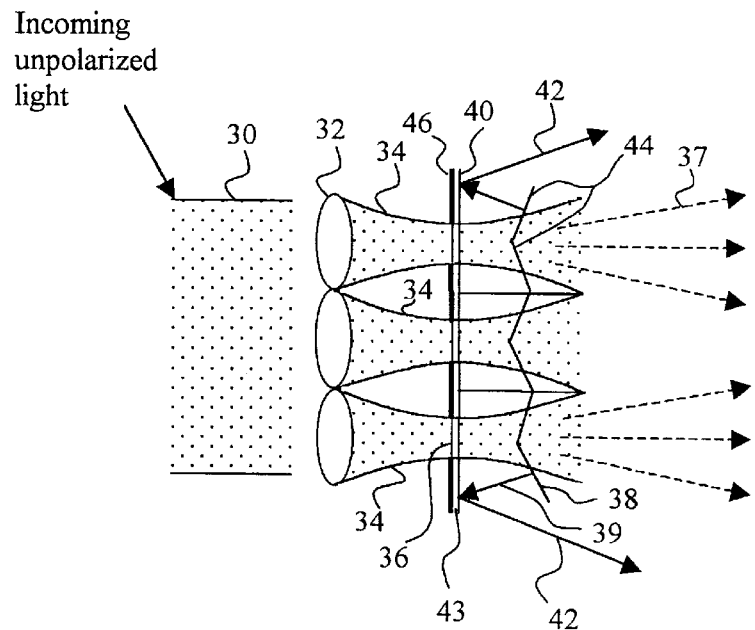
FIG. 3 is a schematic block diagram of a preferred embodiment of the present invention.

In a preferred embodiment, the individual beams 34 propagate through the reflecting polarization converter 40 in order to reach the polarization filter 38. To accomplish this propagation, the reflecting polarization element 40 includes an array of transmissive regions 36, with each transmissive region aligned with a different beam 34. The size of each of the transmissive regions 36 in the reflecting polarization converter 40 approximates the waist of the individual beams 34 in order to ensure maximum transmission of the individual beams 34 by the transmissive regions 36. Accordingly, the transmissive regions 36 in the reflecting polarization converter 40 are preferably on the same scale as the micro lenses in the micro lens array 32, with the transmissive region centerline to centerline spacing being substantially the same as the centerline to centerline spacing between micro lenses in the micro lens array 32. The transmissive regions 36 may be formed simply by making holes extending through the reflecting polarization converter 40 of the appropriate diameter aligned with the individual micro lenses. This implementation of the transmissive regions 36 is shown in FIG. 2. Alternatively, in a preferred embodiment, the transmissive regions 36 may be formed in the reflecting polarization converter 40 by forming regions of the appropriate size with no reflective backing aligned with individual micro lenses for transmitting the individual beams to the polarization filter 38. This embodiment of the transmissive regions 36 is shown in FIG. 3.

Figure 4:
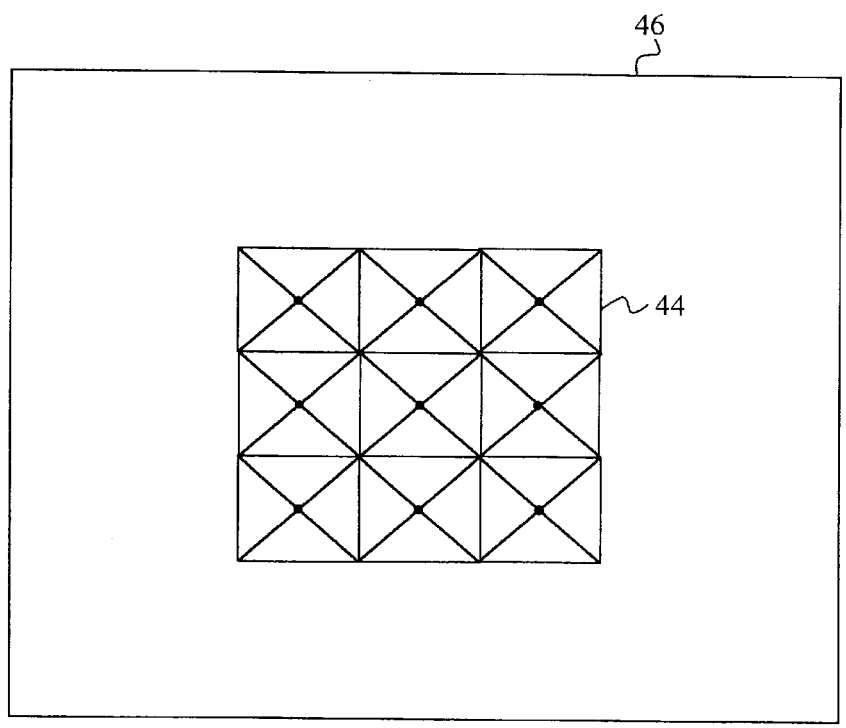
FIG. 4 is a schematic diagram of a reflector or mirror surface that may be used in forming the polarization filter.

As noted above, in the preferred embodiment, the polarization filter 38 functions to reflect light of the perpendicular polarization so that it does not propagate straight back through the transmissive region 36 from which the light beam has come, but rather to a particular area on the reflecting polarization converter 40. In a preferred embodiment, the features 44 shown in FIG. 2 are two-sided sawtooths or four-sided pyramids to reflect the perpendicular polarization of the light beam to a surface of the reflecting polarization converter 40 to the sides adjacent to the transmissive region 36 through which that beam 34 had initially propagated. It can be seen that there are a plurality of sawtooths or pyramids shown in FIG. 2, each sawtooth or pyramid with its apex centerline aligned with the centerline of a different transmissive region 36 and the centerline of a different micro lens in the micro lens array 32. The feature 44 is constructed on the scale of the micro lens, with the centerline to centerline distance being substantially the same as the centerline to centerline spacing of the micro lens array 32. FIG. 4 shows a top view of the features 44 on the polarization filter 38 configured as a matrix of four-sided pyramids. Note that although the feature 44 is illustrated in the top view in FIG. 4 as a pyramid, the present invention could be implemented with any feature shape that appropriately reflects the perpendicular polarization to a desired surface on the reflecting polarization converter 40 including cone shapes, hemispherical-type shapes, aspherical shapes and asymmetric shapes. Note that cone, hemispherical, aspherical and asymmetrical features would require more complex shapes for the surface. Also, note the scale of FIG. 4 is not identical in scale to FIG. 3 for ease of illustration.

The reflecting polarization converter 40 is disposed to re-reflect the reflected light of the perpendicular polarization state and to convert that perpendicular polarization state to the desired polarization state. In a preferred embodiment, the reflecting polarization converter 40 is implemented simply by using a quarter wave plate element 43 with a mirror backing 46 as the base structure, with the transmissive regions 36 formed by not having a mirror backing in those regions. The preferred embodiment with the transmissive regions 36 formed in this manner is shown in FIG. 3. The mirror backing 46 for the reflecting polarization converter 40 may be deposited on a quarter wave plate with appropriate masking techniques used to define the transmissive regions 36 and keep them clear of the mirror material. Alternatively, the mirror or other reflecting material 46 may be formed as a sheet with openings therein defining the transmissive regions 36. This mirror sheet 46 may then be affixed or disposed adjacent to and parallel to the quarter wave plate to form the reflecting polarization converter 40 with the transmissive regions 36 formed therein. FIG. 3 illustrates a mirror surface 46, formed either as a deposition on a surface of a quarter wave plate or a separate sheet affixed or supported parallel to one surface of the quarter wave plate 43, with transmissive regions 36 formed therein that contain no reflective material.

In operation, light beam 39 reflected back by the polarization filter 38 impinges upon the quarter wave plate 43 in the reflecting polarization converter 40, propagates through the quarter wave plate 43 to the reflective mirror backing 46 deposited, affixed, or supported adjacent to the quarter wave plate 43, and is reflected back through the quarter wave plate 43 by the mirror backing. Accordingly, light beam 39 reflected by the polarization filter 38 passes twice through the quarter wave plate 43, thereby converting a perpendicular polarization state to light rays 42 having the desired polarization state. Note that the polarization filter 38 will not be an impediment to the re-reflected light rays 42 because the reflected light rays have now been converted to a polarization state that will be passed through the filter 38. Subsequent optics (not shown) are then provided to gather the light beams 37 and 42 and refocus them in a well-known manner.

It should be noted that the range of emission angles of the beam 42 reflected by the mirror surface 46 of the reflecting polarization converter 40 depends on the geometries, for example the shape and angle, of the features 44 of the polarization filter 38, and on the geometries of the areas around the transmissive regions 36 in the reflecting polarization converter 40. Note that each instance of an area around a transmissive region 36 in the reflecting polarization converter 40 may take a spherical shape, an aspherical shape, or an asymmetric shape. Accordingly, the geometries of the polarization filter 38 and the reflecting polarization converter 40 can be optimized to cause the resulting converted light beams 42 to have a range of emission angles very close to the range of emission angles of the original transmitted light 37 with the desired polarization, i.e., they have a substantially similar angular distribution of rays. This optimization can be accomplished by shaping the elements 38 and/or 40 and empirically determining the optimum shapes. Alternatively, software design programs such as ZEMAX or ASAP may be utilized in this optimization process. Thus, this system can convert a beam of unpolarized light with high efficiency into a beam of polarized light with a size close to the size of the original beam. It should be noted that the drawn shapes of the elements 38 and 40 are for ease of illustration only and are not to scale. It should also be noted that the angles shown for the light beams 37 and 42 are for ease of illustration only.

In a preferred embodiment of the present invention, each micro lens in the micro lens array 32 may be implemented to have a focal length of on the order of 1 mm with a diameter of the micro lens of on the order of 100 microns, and with a spacing between lenses of on the order of 100 microns. It should be noted that the micro lens parameters comprising the focal length, the diameter of the lenses, and the number of lenses per unit length may be optimized empirically to achieve a maximum light polarization efficiency. As a general rule, the spacing of the centers of the individual micro lenses in the micro lens array 32 will be substantially identical to and coincide with the spacing and location of the centers of the transmissive regions 36 in the reflecting polarization converter 40, with a different transmissive region 36 being provided for each of a plurality of the micro lenses in the micro lens array 32. Note that the diameter of each of the transmissive regions 36 in the reflecting polarization converter 40 preferably will be the diameter of the focused beam 34, and thus will depend on the optical characteristics of the lenses used in the micro lens array 32. By way of example, micro lens arrays designed by 3M or by NEC Optics may be utilized to implement the present invention.

As noted above, in order to optimize the polarization device of the present invention, the polarization filter 38 or its functional equivalent and/or the reflecting polarization converter 40 should be shaped so as to guide the reflected light beams 42 along paths that are substantially parallel to the unreflected light beams 37, i.e., having a substantially similar angular distribution of rays, but offset from the light beam 37 by ½ the lens array spacing. The number of lenses in the micro lens array 32 must be large enough so that the resulting beam comprising the unreflected light bundles 37 and the reflected/converted light bundles 42 fills with sufficient uniformity the etendue of the optical transport system that follows the device. This optimization will depend on the characteristics of the subsequent optical transport system, and therefore cannot be specified in advance.

The present invention provides a method of transforming unpolarized light into polarized light with high efficiency. The polarized light resulting from the present invention is contained in a single beam with a size close to the original unpolarized beam. This contrasts with the prior art where the original beam is expanded to twice its original size in order to obtain all of the light in a single polarization. Thus, the present invention provides light which can be easily utilized in optical systems resulting in higher system efficiency and less complexity than would otherwise be required to improve beam properties.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

We claim:

1. A polarization device, comprising:

a light path;

a micro lens array disposed in said light path for separating light into a plurality of individual beams of light;

a polarization filter comprising a polarizing film, said polarization filter being disposed in said light path to receive a plurality of said beams of light and to transmit said received light of a desired polarization state and to reflect said received light of a perpendicular polarization state that is perpendicular to said desired polarization state; and a reflecting polarization converter disposed to receive and reflect said reflected light of said perpendicular polarization state and to convert said perpendicular polarization state to said desired polarization state, said polarization filter and said reflecting polarization converter being separated by a non-solid-filled gap, wherein said reflecting polarization converter re-reflects at least a portion of said converted light back onto said polarization filter.

2. A device as defined in claim 1, wherein said polarization filter is shaped to reflect said received light of said perpendicular polarization state in each of said individual beams of light so that they do not substantially propagate back exactly in the direction from which they have come.

3. A device as defined in claim 1, wherein said reflecting polarization converter is disposed in said light path between said micro lens array and said polarization filter and includes a plurality of transmissive regions, each of a plurality of said transmissive regions being aligned with a different one of said individual beams of light to transmit said beam of light aligned therewith.

4. A device as defined in claim 3, wherein said polarization filter is shaped to reflect said received light of said perpendicular polarization state of each of said individual beams of light at an angle so that reflected light impinges on areas on said reflecting polarization converter other than said plurality of transmissive regions.

5. A device as defined in claim 3, wherein said transmissive regions are formed by holes in said reflecting polarization converter.

6. A device as defined in claim 3, wherein said reflecting polarization converter comprises a quarter wave plate and a reflective surface disposed parallel thereto with said transmissive regions comprising openings defined in said reflective surface.

7. A device as defined in claim 6, wherein said reflective surface is disposed on said quarter wave plate.

8. A device as defined in claim 1, wherein said reflecting polarization converter includes a reflective surface disposed on one face of a quarter wave plate.

9. A device as defined in claim 1, wherein a geometry of said polarization filter and a geometry of said reflecting polarization converter cause light reflected from said polarization filter to have substantially a same range of emission angles as said light of said desired polarization state transmitted by said polarization filter.

10. A polarization device, comprising:

a light path;

a micro lens array disposed in said light path for separating light into a plurality of individual beams of light, said micro lens array comprising a plurality of micro lenses, with each of said plurality of micro lenses in said micro lens array having a centerline;

a polarization filter comprising a polarizing film, said polarization filter being disposed in said light path to receive a plurality of said individual beams of light from said micro lens array and to transmit said received light of a desired polarization state and to reflect said received light of a perpendicular polarization state that is perpendicular to said desired polarization state, said polarization filter being shaped to comprise a plurality of surface features therein, each of said surface features shaped symmetrically about a centerline to reflect light from a different one of said individual beams of light in at least two directions at an acute angle to said different one of said individual beams of light; and a reflecting polarization converter disposed between said micro lens array and said polarization filter, with said polarization filter and said reflecting polarization converter being separated by a non-solid filled gap, said reflecting polarization converter receiving and reflecting said reflected light of said perpendicular polarization state and converting said perpendicular polarization state to said desired polarization state, said reflecting polarization converter including a plurality of transmission regions, each of said plurality of transmission regions having a centerline aligned with a different one of said individual beams of light to transmit said beam of light aligned therewith, and wherein each of said plurality of micro lenses has its centerline aligned with the centerline for one of said transmissive regions and with the centerline for one of said surface features of said polarization filter, wherein said reflecting polarization converter re-reflects at least a portion of said converted light back onto said polarization filter.

11. A device as defined in claim 10, wherein said surface feature comprises a sawtooth shape disposed to project toward said transmissive region aligned therewith.

12. A device as defined in claim 10, wherein said surface feature comprises a pyramid shape disposed to project toward said transmissive region aligned therewith.

13. A method for polarizing light, comprising:

separating light in a light path into a plurality of individual beams of light;

passing each of said plurality of individual beams of light through a different associated transmissive region in an element;

passing said plurality of individual beams of light through a non-solid filled gap to a polarization filter comprising a polarizing film;

filtering said plurality of individual beams of light with said polarization filter into light beams with a desired polarization state and light beams with a perpendicular polarization state substantially perpendicular to said desired polarization state;

transmitting, with a first range of emission angles, said light beams of said desired polarization state, and reflecting said light beams with said perpendicular polarization state, not straight back into said transmissive region associated with said light beam, but back through said gap toward said element onto a surface on said element adjacent said associated transmissive region in said element;

converting said perpendicular polarization state thereof to said desired polarization state and re-reflecting from said surface said reflected light beams of said perpendicular polarization state back through said gap toward said polarization filter, said re-reflected light beams having substantially the same range of emission angles as said first range of emission angles of said transmitted light beams of said desired polarization state.

14. A polarization device, comprising:

a light path;

a micro lens array disposed in said light path for separating light into a plurality of individual beams of light, said micro-lens array comprising a plurality of micro lenses, each of said micro lenses having a centerline;

a polarization filter comprising a polarizing film, said polarization filter being disposed in said light path to receive a plurality of said beams of light and to transmit said received light of a desired polarization state and to reflect said received light of a perpendicular polarization state that is perpendicular to said desired polarization state, said polarization filter additionally comprising a plurality of pyramid shaped surface features, each of said pyramid shaped surface features formed symmetrically about a different respective centerline; and a reflecting polarization converter disposed to receive and reflect said reflected light of said perpendicular polarization state and to convert said perpendicular polarization state to said desired polarization state, said reflecting polarization converter comprising a mirror backing, a quarter wave plate coupled to said mirror backing, and a plurality of transmissive regions, said transmissive regions having a centerline, said polarization filter and said reflecting polarization converter being separated by a non-solid filled gap, wherein each of said plurality of said micro lenses has its centerline aligned with the centerline for one of said transmissive regions in said reflecting polarization converter and with the centerline for one of said pyramid shape surface features of said polarization filter, and wherein said reflecting polarization converter re-reflects at least a portion of said converted light back onto said polarization filter.

15. A polarization device, comprising:

a light path;

a micro lens array disposed in said light path for separating light into a plurality of individual beams of light, said micro lens array comprising a plurality of lenses each with a centerline;

a polarization filter comprising a polarizing film, said polarization filter being disposed in said light path to receive a plurality of said beams of light and to transmit said received light of a desired polarization state and to reflect said received light of a perpendicular polarization state that is perpendicular to said desired polarization state, said polarization filter additionally comprising a plurality of surface features each shaped symmetrically about a centerline; and a reflecting polarization converter disposed to receive and reflect said reflected light of said perpendicular polarization state and to convert said perpendicular polarization state to said desired polarization state, said reflecting polarization converter being separated from said polarization filter by a non-solid filled gap, wherein said reflecting polarization converter re-reflects at least a portion of said converted light back onto said polarization filter.

16. A polarization device according to claim 15, wherein each of said surface features comprises a tooth in a sawtooth shape disposed to project toward said reflecting polarization converter.

17. A polarization device according to claim 15, wherein each of said surface features comprises a pyramid shape disposed to project toward said reflecting polarization converter.

* * * * *